Aug. 27, 1968  J. W. DANIEL, JR  3,399,405
VEHICLE IDENTIFIER SYSTEM
Filed March 29, 1966  2 Sheets-Sheet 1
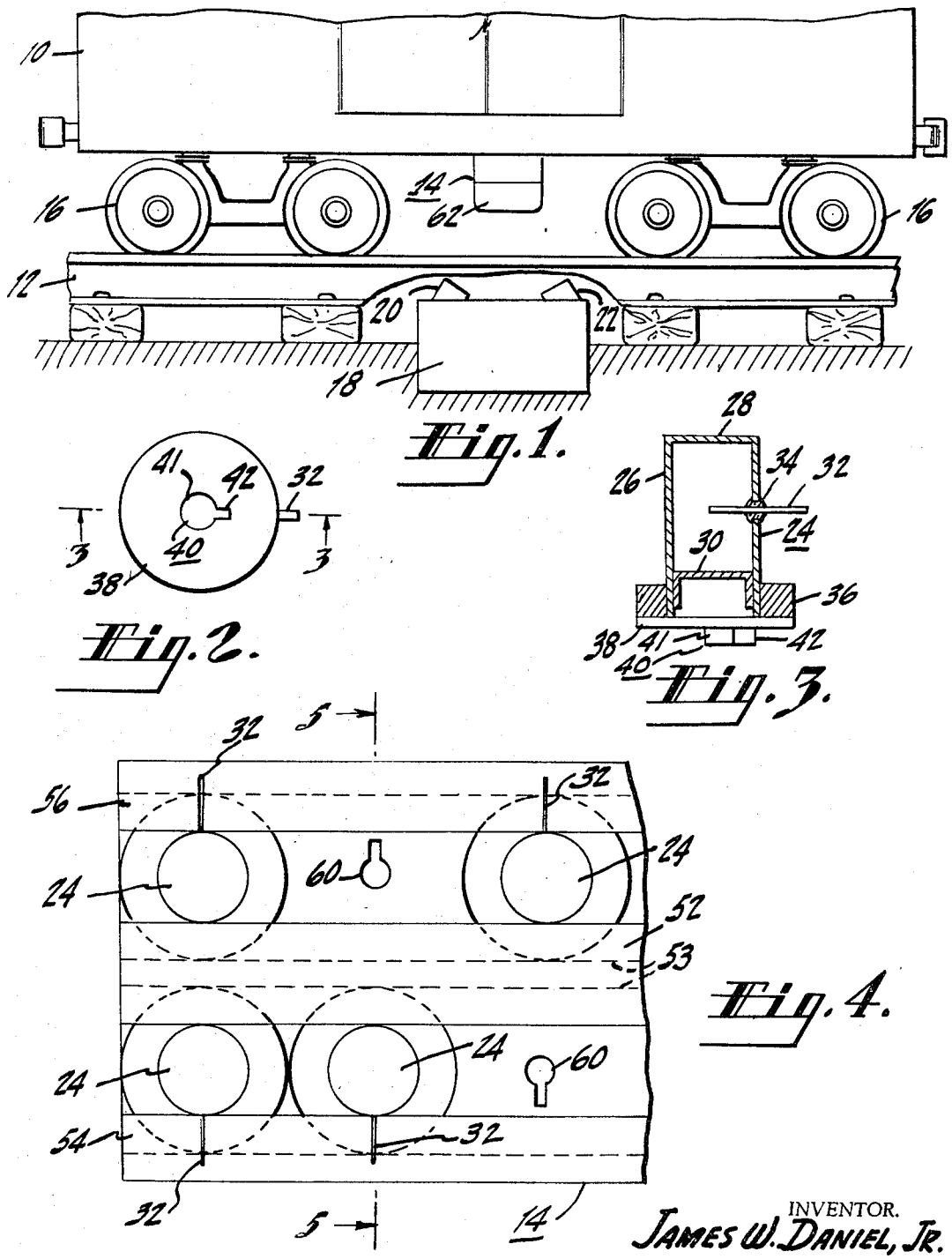
INVENTOR.
JAMES W. DANIEL, JR.
BY
Edward J. Norton
Attorney Aug. 27, 1968            J. W. DANIEL, JR            3,399,405
VEHICLE IDENTIFIER SYSTEM
Filed March 29, 1966                    2 Sheets-Sheet 2
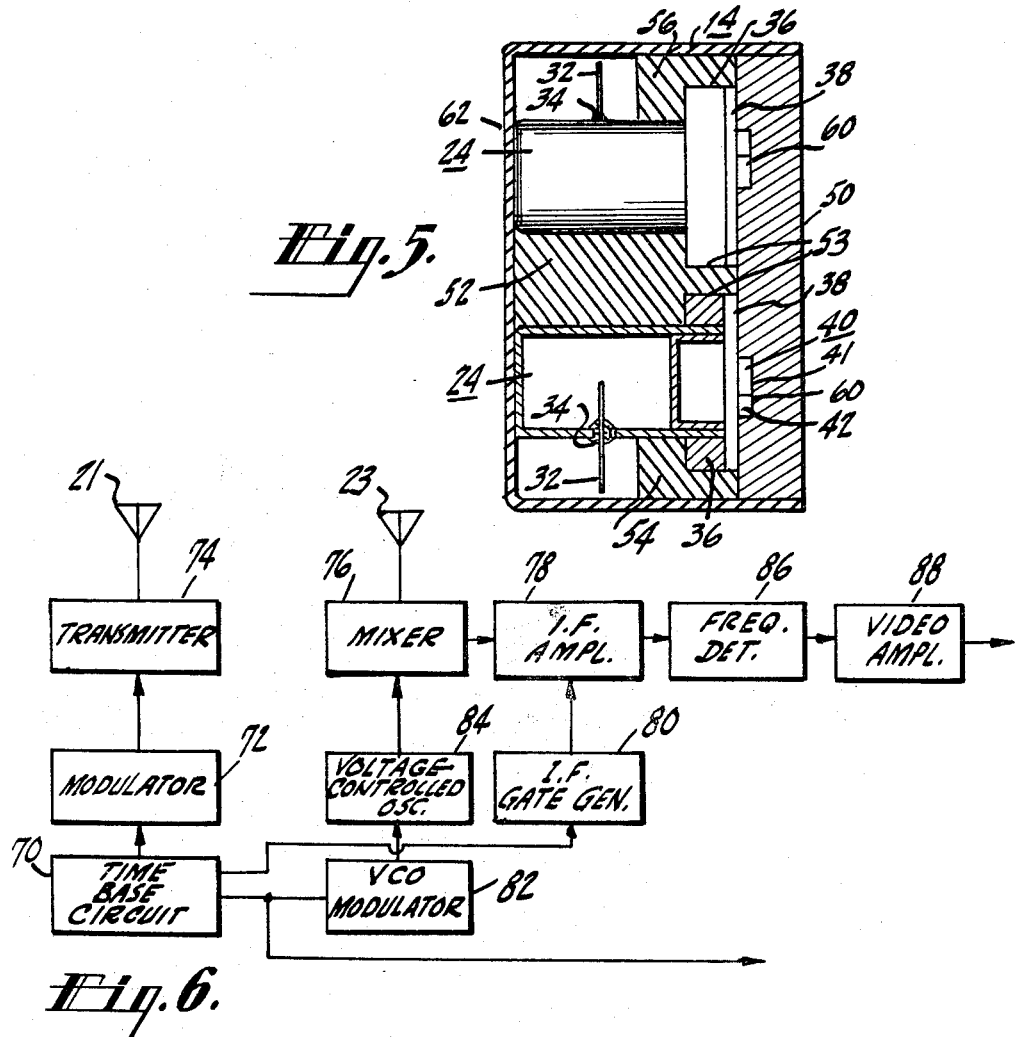
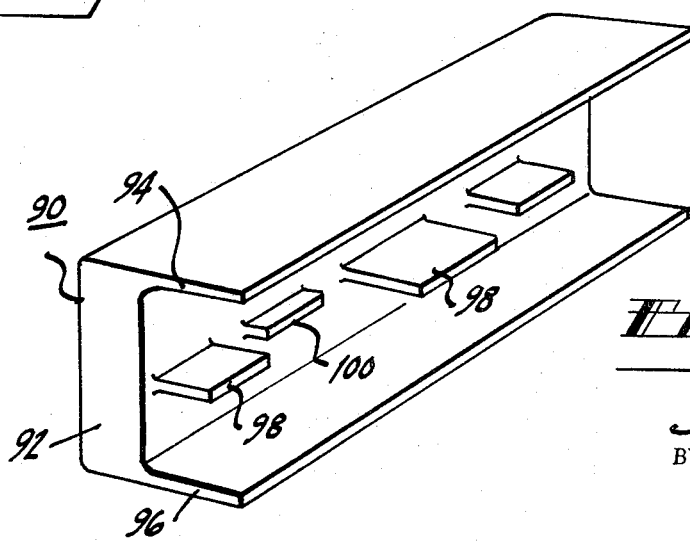
INVENTOR.
JAMES W. DANIEL, JR.
BY
Edward J Norton
Attorney

United States Patent Office 3,399,405
Patented Aug. 27, 1968

3,399,405
VEHICLE IDENTIFIER SYSTEM
James W. Daniel, Jr., Cherry Hill, N.J., assignor to Radio Corporation of America, a corporation of Delaware
Filed Mar. 29, 1966, Ser. No. 538,426
11 Claims. (Cl. 343—6.5)

This invention relates to electronic means for identifying vehicles at or passing by a given point, and particularly to an arrangement for identifying railroad cars as they move along a railroad track.

It is advantageous for a railroad dispatcher to know where the railroad cars are, at any particular time, for many reasons including checking on the positions and routes of the cars, finding lost or strayed cars and planning the most expeditious routing therefor. Since centralized computers having memories are available to the railroad companies, normally only the identification of the cars is necessary since other facts about the cars such as their lading and destination may be stored in the computer memory.

Car detection and identification apparatus should be economical in first cost, in installation and in maintenance. It is preferable that the portion of the apparatus carried by the car require no power source that may need replacing. The apparatus should not require adjustment after it is installed, and should take up as little space as possible. It is also advantageous that no structural part of the identification apparatus project beyond the lines of the car or from the railroad yard or from the tracks, since such projections can provide hazards for other cars and for personnel operating the cars. The car detecting and identification apparatus should be operative in all kinds of weather, with all degrees of illumination, and should not be rendered inoperative by soot or other dirt that may have settled on the surface of the car. The identification apparatus should be capable of identifying the great number of cars in use in this country, and it should also be capable of identifying the owner or operator of the cars.

It is an object of this invention to provide an improved apparatus for detecting and identifying vehicles positioned at or passing a predetermined location.

It is a further object to provide an improved vehicle identification apparatus requiring a minimum of space on the vehicle to be identified.

Another object is to provide an improved vehicle identifying apparatus capable of identifying a vehicle in all conditions of weather, of illumination and in all conditions of cleanliness of the vehicle.

Still another object is to provide an improved vehicle identification apparatus capable of identifying any one of a great number of vehicles as well as any one of a great number of vehicle owners and users.

In accordance with one embodiment of this invention a transponder apparatus is carried by each vehicle to be identified. This transponder includes a number of metallic resonant chambers or structures each tuned to resonate when energized at a different frequency. The resonant structures in each of the transponders are resonant at selected frequencies within a predetermined range of frequencies. Each transponder is identified by the presence of structures resonant at certain frequencies within the predetermined range of frequencies and by the absence of structures resonant at other frequencies within the predetermined range of frequencies. The particular combination and relationship of frequencies assigned to one transponder and defined by the presence of certain resonant structures and the absence of other resonant structures is different from the combination and relationship of frequencies assigned to every other transponder. Each resonant structure may have or comprise its own antenna for transferring energy to and from the structure. A pair of antennas comprising a transmitting and a receiving antenna are located at various, selected places along the path of the vehicle to be identified. A separate transmitter is coupled to each transmitting antenna and a separate receiver is coupled to each receiving antenna of the pairs thereof. Each transmitter comprises means to provide via the associated transmitting antenna a short pulse of a wave at a frequency sufficiently close to the frequency of the resonant structures carried in the transponders of all the vehicles and of sufficiently high power to energize the resonant structures so that they resonate at their individual frequencies.

Upon applying a pulse from the transmitter and transmitting antenna to all the antennas forming part of the several resonant structures included in a particular transponder mounted on a nearby or passing vehicle, all the resonant structures included in the transponder are made to ring. At the end of the transmitted pulse, all the resonant structures continue to ring, whereby waves at the tuned frequencies of the resonant structures are radiated by the individual antennas thereof. These radiated waves are received by the receiver which is positioned near the transmitter. The receiver indicates the relative frequencies of the received waves and thereby provides by its indication a word or number which identifies the transponder. the word or number is identified not only from the actual frequencies received but also is determined by the relationship of the frequencies defined by the presence of certain resonant structures and the absence of other resonant structures in a transponder. Since the relative tuning of the various resonant structures or chambers in a given transponder will not change greatly due to ambient or environmental changes such as changes in temperature, the indication by the receiver is free of errors due to such changes in operating conditions.

The invention will be understood more readily from the following description when read in conjunction with the accompanying drawing in which FIGURE 1 is a diagrammatic showing of an arrangement of the transmitter and receiver and transponder of this invention when used to identify railroad cars, FIGURE 2 is a bottom view of a resonant chamber usable by way of example in the transponder of FIGURE 1, FIGURE 3 is a sectional view of the resonant chamber taken along line 3—3 of FIGURE 2, FIGURE 4 is a fragmentary plan view of the transponder of FIGURE 1, FIGURE 5 is a sectional view of the transponder of FIGURE 4 taken along line 5—5, FIGURE 6 is a block diagram of a circuit usable in the identifying apparatus of FIGURE 1, and FIGURE 7 is a perspective view of a further metallic resonant structure that may be used in the transponder of FIGURE 1.

Referring to FIGURE 1, a railroad freight car 10 to be identified is positioned on the track 12. The car 10 carries a transponder 14 at a position between the wheels 16 of the car 10 and at an elevation above the bottom of the axles of the wheels 16 whereby the transponder 14 is in a safe position as far as obstructors on the track are concerned. The transponder 14 will be described hereinafter in connection with FIGURES 2 to 5 and 7. A rectangular casing 18 is shown buried between the rails 12, in such a position that the top thereof is below the level or just above the level of the ties whereby it is out of contact with any car or cars passing over the tracks and does not itself act as an obstruction. The casing 18 includes a pair of protuberances 20 and 22 which extend upwardwardly and at an angle from the top of the container 18. A transmitting antenna 21 (FIGURE 6, not shown in FIGURE 1) is positioned in the protuberance 20 and a receiving antenna 23 (FIGURE 6, not shown in FIGURE 1) is positioned in protuberance 22. The protuberances 20 and 22 and the antennas 21 and 23 are so positioned and so oriented that they are each focused on the transponder 14 carried by the car 10 when the transponder 14 is directly over the top of the container 18. The container 18 may contain the high frequency portions of the transmitter and receiver of the vehicle identifier, to be described hereinafter in connection with FIGURE 6. Suitable leads (not shown) extend from the container 18 to a centrally located position which includes the read-out devices of one or more vehicle identifiers. In the alternative, the container 18 may contain only the antennas with suitable transmission means extending from the casing 18 to radio equipment positioned at a central location.

A resonant chamber 24 which may comprise a part of the transponder 14 is shown in FIGURES 2 and 3. This chamber 24 comprises a casing which may be a metallic can or cylinder 26 which is closed at one end 28 and into the other end of which a metallic closure 30 may be conductively fitted. The resonant frequency corresponding to the length mode of the chamber 24 is adjusted by moving the closure 30 in and out until the chamber is resonant at a predetermined frequency. The closure 30 is then fixed in position as by soldering or welding. Other methods of tuning the chamber 24, such as adjustably inserting a screw into the chamber may be used. Other chambers 24 also comprise an outer cylinder 26 of the same size, but the closure 30 will be so positioned in each of the chambers as to provide resonance thereof at different frequencies. A complete set of chambers 24 (when used) will each be tuned to a frequency different from that to which the other chambers are tuned. The spacings between the resonant frequencies to which the chambers are tuned is substantially uniform. The spacing between frequencies should be great enough so that the frequencies of the resonant chambers can be distinguished by a receiver and yet be small enough so that a pulse transmitted by a transmitter will cause them all to ring at their individual adjusted frequencies. An antenna 32 in the form of a probe projects through the wall of the container 26, and is insulated therefrom by an insulator 34. The inner end of the antenna 32 is electrically coupled to a suitable mode of the resonant chambers 24 such as the resonant frequency which is determined by the length of the chamber. Each resonant chamber 24 has a cylinder 36 fixed around an end thereof, the lower end as viewed in FIGURE 2, to form a flange surrounding the can 26. A disk 38 closes the bottom end of the cylinder or can 26. A key 40 extends downwardly from the disk 38, the key 40 comprising a cylindrical portion 41 and an orienting portion 42.

The transponder 14 of FIGURES 4 and 5 is built to hold a predetermined number, for example, thirty, resonant chambers 24. The number of resonant chambers 24 actually used in a given transponder 14 is anywhere from one to thirty in number and spaces in the transponder 14 not taken up by the resonant chambers 24 are left vacant. As described below, the transponder may contain other different metallic resonant structures than that shown by way of example in FIGURES 2 and 3.

The transponder 14 includes an elongated base 50 which is fastened to the car 10 by suitable means not shown. As shown in FIGURES 4 and 5, the transponder 14 includes a separator 52 running the length of the base 50 perpendicular thereto and centrally positioned therealong. The separator 52 includes a pair of oppositely facing grooves 53 (see FIGURE 5) running therealong adjacent the base 50. A pair of grooved reflectors 54 and 56 also running the length of the base 50 are fixed to the opposite longitudinal edges of the base 50. The grooves in the reflectors 54 and 56 face each other. The grooves in the reflectors 54 and 56 and in the separator 52 are shaped to receive the cylinders of flanges 36 of the resonant chambers 24. The reflectors 54 and 56 are shown as made of metal but they may be made of insulating material having the surface thereof away from the base 50 covered with metal. Keyholes 60 are formed in the base 50 and are shaped to receive the keys 40 and to so orient the chambers 24 that the antennas 32 extend in a direction over and parallel to the exposed surface of the reflectors 54, 56 and perpendicular to the separator 52. A cover 62 of a tough plastic material, for example, which is transparent to waves of frequencies at which the resonant chambers are resonant is provided. The cover 62 is shaped so as to contact the edges of the base 50 to which it may be fastened by suitable means and to contact the top of the resonant chambers 24 and the divider 52. In this manner, the cover 62 when it is in position as shown in FIGURE 5 holds the resonant chambers 24 in oriented position on the base 50. The transponder 14 is fixed at the base 50 to the car 10 of FIGURE 1 in such a position that it extends perpendicularly to the length of the car 10. For clarity, the cover 62 is not shown in FIGURE 4.

A block diagram of one example of a car identifying circuit usable with the present invention is shown in FIGURE 6. The circuit includes a time base circuit 70 which produces pulses approximately one nano-second in duration at two of its output terminals and a ramp voltage at a third output terminal which starts at the end of each pulse. The short pulse appearing at one output is applied to a modulator 72. The modulator 72 causes a transmitter 74 to apply to the antenna 21 an alternating current (A.C.) pulse of about one nano-second duration and of a frequency and amplitude sufficient to cause all the resonators 24 in any adjacent transponder 14 to resonate. The resonators resonate at their own frequencies and the radiated waves therefrom are picked up by the antenna 23. The received waves are applied to a mixer 76 which in turn applies an output wave to an IF amplifier 78. The pulse produced by the time based circuit 70 and appearing at another output thereof is applied to an IF gate generator 80 which produces a pulse of about two micro-seconds duration. The output of the IF gate generator 80 is applied to the IF amplifier 78 to block it for the duration of the two micro-second pulse; that is, for the time that the transmitter 74 is transmitting and for a short time longer to prevent the IF amplifier 78 from responding to any waves received directly by the antenna 23 from the transmitting antenna 21 and also to prevent the IF amplifier 78 from responding to other inadvertent rings of any nearby structures other than the resonant chambers 24 and to reflected waves. All reflections and inadvertent ringings will cease while the IF amplifier 78 is disabled whereby only the waves actually radiated by the resonant frequency chambers 24 carried by the transponder 14 will pass through the IF amplifier 78. The ramp voltage produced by the time base circuit 70 is applied to a voltage controlled modulator 82, the output of which is applied to a voltage controlled oscillator 84 to vary its frequency linearly. The output of the voltage controlled oscillator 84 is applied to the mixer 76 whereby all possible waves radiated by the several resonant chambers 24 included in the transponder 14 are scanned and are applied by the IF amplifier 78 to a frequency detector 86. The output of the detector 86 comprises a plurality of pulses separated in time in accordance with the frequency spacing thereof. The output of the detector 86 is applied to a video amplifier 88 and the output of the video amplifier 88 is applied to a read-out device (not shown) such as a cathode ray tube (CRT). The ramp voltage from the time base circuit 70 may be applied to the CRT, whereby a plurality of pips will be shown on the screen of the CRT to indicate the reception of radiated waves.

These pips will be separated by undeflected portions of the base line of lengths that vary. Each pip represents a binary "one" and each portion of undeflected base line greater than a predetermined minimum length represents one or more binary "zeros" depending on the length of the undeflected base line between pips, whereby the read-out device indicates a number or word in a code. Using anywhere from one to say thirty resonant chambers to produce "one" indications, the absence of a chamber producing "zero" indications, different thirty digit binary numbers may be produced responsive to different transponders, whereby $2^{30}-1$ or approximately $10^9$ different vehicles may be identified. Having such a large number at one's disposal, parts of the number may be used to identify the vehicle and other parts may be used to indicate its owner or operator. If desired, the identity of the same vehicle may be determined several times, whereby erroneous signals may be detected and discarded.

As noted above, other metallic resonant structures may be used instead of the chambers 24 described in connection with FIGURES 2 through 5. One such metallic structure is shown in FIGURE 7. A metallic structural form 90 is provided. This form 90 includes a base portion 92 and parallel opposed side walls 94 and 96 extending from opposite edges of the base portion. The base portion 92 may have its corners rounded off as shown, and the inner junctions of the walls 94 and 96 and the base 92 may also be rounded off as shown. A series of tongues 98 are provided between the side portions 94 and 96. These tongues 98 are each tuned to one of a series of frequencies to which the chambers 24 of a full set of chambers, for example, thirty, are tuned, whereby the structure 90 may have thirty tongues 98 each tuned to a different frequency. Frequencies that are to be eliminated to provide the word or number that identifies a vehicle 10, as mentioned above, may be eliminated by removing a tongue or tongues 98 corresponding to the eliminated frequencies, as shown for example at 100, or by short-circuiting a tongue or tongues 98 to a wall or walls 94 and 96. This elimination of frequencies may take place in the field, that is, at the time that the transponder containing the structural form 90 is fixed to the car to be identified. The tongues 98 themselves act as antennas and the inner surfaces of the base 92 and the walls 94 and 96 act as reflectors. The resonant structure 90 may be made from an extruded metallic rod having a base 90 and parallel side walls 94 and 96 as shown in FIGURE 7 and an intermediate partition which extends parallel to the walls 94 and 96 (not shown), which is later cut into resonant tongues 98. The structure 90 may be of convenient length. One or more thereof may be used in the transponder 14 instead of the chambers 24 shown in FIGURES 2 and 3 in which case the reflectors 54 and 56, the keyholes 60 and the separator 52 as shown in FIGURE 4 will not be necessary, since the cover 62 will hold the structures 90 in place in the transponder 14.

While the tongues 98 are shown as having a rectangular cross section taken by a plane parallel to the base 92, the tongues may be square or round or have any dimensions necessary to produce the required resonances thereof.

Ambient conditions such as temperature changes may change the length dimensions and therefore the resonant frequencies of all the resonant chambers 24 or the resonant frequency of the tongues 98 in a transponder 14. However, the frequencies of all the metallic resonant elements will be varied in the same direction whereby a CRT display will still show the same relative positions of the pips and of the undeflected base line between pips on its screen, even though the individual frequencies corresponding to the pips are varied. Therefore, the indication produced by the described system is accurate independently of ambient conditions. If desired, all transponders may carry a chamber 24 or tongue 98 tuned to a reference frequency which causes the indication of a "one" at an extreme position in the digital response produced by the read-out device. Since ambient conditions may cause a shift in the position of all the pips including the reference pip, the use of a reference resonant chamber may add certainty to the read-out where the first or the first few digits of the numbers are zeros.

While the vehicle identifying system has been described with reference to railroad cars and tracks, it is obvious that the system can be used with any kind of vehicle carrying a transponder and passing over or by a spot where a casing such as a casing 18 is positioned. For example, it may be used to identify aircraft. If desired, an antenna 32 may be pulled out of a chamber 24, disabling that chamber, to cause the appearance of binary zeros, instead of removing the whole chamber. This may be done in the field, or the transponder 14 may be shipped already coded. While resonant chambers 24 having wire antennas 32 are disclosed, any metallic resonant structures having any type of antennas, or themselves acting as antennas are usable in the above-described system. Furthermore, any type of receiver-transmitter combination that will cause energization of the several resonant structures carried by a vehicle and will receive the waves radiated thereby and show the actual or relative frequencies of the received radiated waves is usable in the described system. While a CRT read-out device is described, any suitable read-out device may be used that translates the operation of the resonant structures into a number or word.

Therefore, the above description is to be considered as illustrative and not in a limiting sense.

What is claimed is:
1. A vehicle identification system comprising
   a transponder carried by the vehicle to be identified,
   said transponder including one or more metallic resonant elements each of said metallic elements being tuned to a different one of a predetermined series of resonant frequencies,
   means to transmit a pulse to said transponder to cause each of said metallic resonant elements to ring at its own resonant frequency and to radiate waves at its own resonant frequency, and
   means to receive said waves and identify the vehicle carrying said transponder by detecting the presence of said waves at the resonant frequencies of said elements and the absence of other waves at frequencies in said predetermined series of resonant frequencies.

2. The invention as described in claim 1 in which said metallic resonant elements comprise resonant chambers.

3. The invention as described in claim 1 in which said metallic resonant elements each comprise a resonant chamber having an antenna in the form of a probe, said transponder comprising at least one reflector for said antennas.

4. The invention as described in claim 1 in which said metallic resonant elements are formed as tongues extending from a metallic base between walls extending from said base.

5. The invention as described in claim 1 and including means to disable said receiving means during transmission by said transmitting means and for a period after transmission has ceased sufficient in duration so that said receiving means will not respond to direct reception from said transmitting means or to ringing of or reflection from other structures than said resonant elements.

6. The invention as described in claim 1 and including means to disable said receiving means during transmission by said transmitting means and for a period after transmission has ceased sufficient in duration so that said receiving means will not respond to direct reception from said transmitting means or to ringing of or reflection from other structures than said resonant elements, and means in said receiving means to cause it to scan said received waves for all of the frequencies in said predetermined series of resonant frequencies.

7. A vehicle identification system whose indication is not subject to error due to changes in ambient conditions comprising
- a transponder carried by the vehicle to be identified,
- said transponder including one or more metallic resonant elements, each of said metallic resonant elements being tunable to a different one of a predetermined series of frequencies, the tuning of each of said resonant elements varying in the same direction and by similar amounts due to changes in said ambient conditions,
- means to transmit a pulse to said transponder to cause each of said metallic resonant elements to ring at its own resonant frequency and to radiate waves at its own resonant frequency, and
- means to receive said waves and identify the vehicle carrying said transponder by determining the relationship between said waves at the resonant frequencies of said elements actually received and other waves at frequencies in said predetermined series of frequencies not received.

8. A transponder comprising an elongated base having a reflector extending along an edge of said base and a plurality of resonant chambers which are resonant to selected frequencies selected from a predetermined series of resonant frequencies mounted on said base, each of said chambers having an antenna extending over and parallel to said reflector.

9. In the invention described in claim 8 there being a pair of reflectors extending along the opposite edges of said base with each of said chambers having an antenna extending therefrom, some of said antennas extending over and parallel to one of said reflectors and the others of said antennas extending over and parallel to the other of said reflectors.

10. A resonant structure comprising a conductive base and a pair of opposed parallel conductive walls extending from said base, and a plurality of tongues extending from said base between said walls, each of said tongues being tuned to resonate at a frequency within a predetermined range of frequencies.

11. A resonant structure as claimed in claim 10 and wherein each of said tongues is tuned to resonate at a frequency different from that to which the remaining tongues are tuned.

References Cited

UNITED STATES PATENTS

| | | | |
|---|---|---|---|
| 3,152,304 | 10/1964 | Ringer et al. | 343—6.8 X |
| 3,247,509 | 4/1966 | Hamann et al. | 343—6.555 |
| 3,270,338 | 8/1966 | Watters | 343—6.555 |

RODNEY D. BENNETT, *Primary Examiner.*

M. F. HUBLER, *Assistant Examiner.*